(12) United States Patent
Zhang et al.

(10) Patent No.: US 10,098,048 B2
(45) Date of Patent: Oct. 9, 2018

(54) METHOD AND APPARATUS FOR SERVICE OFFLOADING BETWEEN DIFFERENT NETWORKS

(71) Applicant: Huawei Technologies Co., Ltd., Shenzhen, Guangdong (CN)

(72) Inventors: Feng Zhang, Shanghai (CN); Tao Kong, Shenzhen (CN); Xinghong Shang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 84 days.

(21) Appl. No.: 15/196,995

(22) Filed: Jun. 29, 2016

(65) Prior Publication Data

US 2016/0309385 A1 Oct. 20, 2016

Related U.S. Application Data

(63) Continuation of application No. PCT/CN2014/093041, filed on Dec. 4, 2014.

(30) Foreign Application Priority Data

Dec. 30, 2013 (CN) .......................... 2013 1 0746208

(51) Int. Cl.
*H04W 36/22* (2009.01)
*H04W 28/10* (2009.01)
*H04W 48/14* (2009.01)

(52) U.S. Cl.
CPC .......... *H04W 36/22* (2013.01); *H04W 28/10* (2013.01); *H04W 48/14* (2013.01)

(58) Field of Classification Search
CPC ..... H04W 84/12; H04W 48/18; H04W 88/06; H04W 48/16; H04W 36/22; H04W 28/08
See application file for complete search history.

(56) References Cited

U.S. PATENT DOCUMENTS

| 2014/0219253 | A1* | 8/2014 | Henttonen | ............ | H04W 36/30 370/332 |
| 2014/0334444 | A1 | 11/2014 | Sachs et al. | | |
| 2015/0358857 | A1 | 12/2015 | Duan et al. | | |

(Continued)

FOREIGN PATENT DOCUMENTS

| CN | 101801060 A | 8/2010 |
| CN | 102007800 A | 4/2011 |

(Continued)

*Primary Examiner* — Jung Park

(57) ABSTRACT

Embodiments of the present invention disclose a method and an apparatus for service offloading between different networks. By means of capability negotiation between an ANDSF unit and user equipment, a network side controls the user equipment to send an ISRP request to the ANDSF unit; a non-3GPP network is accessed by using an instruction, generated by the ANDSF unit according to the ISRP request, for instructing to access the non-3GPP network; and after the UE is simultaneously connected to a 3GPP network and the non-3GPP network, services of the user equipment that camp on the 3GPP network and services of the user equipment that camp on the non-3GPP network are indicated according to an ISRP offloading policy that is delivered by the ANDSF unit according to the ISRP request.

13 Claims, 7 Drawing Sheets

(56) References Cited

U.S. PATENT DOCUMENTS

| | | | |
|---|---|---|---|
| 2016/0007268 A1* | 1/2016 | Jung | H04W 48/08 |
| | | | 370/338 |
| 2016/0165428 A1* | 6/2016 | Lee | H04W 8/20 |
| | | | 455/434 |
| 2016/0212667 A1* | 7/2016 | Kim | H04W 48/18 |
| 2016/0295483 A1* | 10/2016 | Jung | H04W 28/08 |
| 2016/0309385 A1 | 10/2016 | Zhang et al. | |

FOREIGN PATENT DOCUMENTS

| | | |
|---|---|---|
| CN | 103209440 A | 7/2013 |
| CN | 103747486 A | 4/2014 |
| WO | 2013/022219 A1 | 2/2013 |

\* cited by examiner

US 10,098,048 B2

METHOD AND APPARATUS FOR SERVICE OFFLOADING BETWEEN DIFFERENT NETWORKS

CROSS-REFERENCE TO RELATED APPLICATIONS

This application is a continuation of International Application No. PCT/CN2014/093041, filed on Dec. 4, 2014, which claims priority to Chinese Patent Application No. 201310746208.3, filed on Dec. 30, 2013, both of which are hereby incorporated by reference in their entireties.

TECHNICAL FIELD

The present invention relates to the field of communications, and in particular, to a method and an apparatus for service offloading between different networks.

BACKGROUND

As intelligent terminals are widely applied, in order that UE (user equipment) simultaneously camps on a 3GPP (3rd Generation Partnership Project) network and a non-3GPP network (for example, a WLAN network), a manner in which an operating system corresponding to the UE is modified is used currently, so that services are offloaded to a 3GPP network and a non-3GPP network (for example, a WLAN network).

In the prior art, an operating system corresponding to UE is modified by means of OpenVSwitch, so that an OpenFlow function supported by the operating system implements that the terminal simultaneously camps on a 3GPP network and a non-3GPP network (for example, a WLAN network); and then, the UE successively initiates an ISMP (inter-system mobility policy) procedure and an ISRP (inter-system routing policy) procedure to an ANDSF (access network discovery and selection function) on a network side, to offload services to different networks. The ISMP procedure is used by the UE to access a non-3GPP network (for example, a WLAN network), and the ISRP procedure is used by the UE to acquire an offloading policy that is delivered by a network side, so that the UE performs service offloading according to the offloading policy.

The UE is required to first initiate the ISMP procedure before services are offloaded to a 3GPP network and a non-3GPP network (for example, a WLAN network), but the UE does not execute offloading, and the ISMP procedure is used only to join a non-3GPP network (for example, a WLAN network). Therefore, in the prior art, the ISMP procedure must be performed before the ISRP procedure is initiated, and as a result, excessive network resources are occupied.

SUMMARY

Embodiments of the present invention provide a method and an apparatus for service offloading between different networks, to overcome a problem in the prior art that excessive network resources are occupied because an ISMP procedure must be first performed in a service offloading process.

A first aspect of the embodiments of the present invention provides a method for service offloading between different networks, including:

determining, by an access network discovery and selection function ANDSF unit, a preferred capability attribute according to a network capability request that is sent by user equipment, and feeding back the preferred capability attribute to the user equipment, where the preferred capability attribute includes a non-seamless concurrency capability attribute or a seamless concurrency capability attribute;

receiving, by the ANDSF unit, an ISRP request that is sent by the user equipment by using a 3GPP network, where the ISRP request is determined according to the preferred capability attribute; and when the ANDSF unit finds, according to a cell global identification CGI that is carried in the ISRP request, that a non-3GPP network exists, sending, by the ANDSF unit, an instruction for instructing to access the non-3GPP network, and an ISRP offloading policy to the user equipment, where the ISRP offloading policy is used to indicate services of the user equipment that separately camp on the 3GPP network and the non-3GPP network; and the instruction for instructing to access the non-3GPP network includes an option that is used to instruct the user equipment to turn on a non-3GPP network opening switch that is used to connect to the non-3GPP network, and non-3GPP network hotspot information that is used by the user equipment for scanning and accessing the non-3GPP network.

In a first implementation manner according to the first aspect of the embodiments of the present invention, the determining, by an access network discovery and selection function ANDSF unit, a preferred capability attribute according to a network capability request that is sent by user equipment, and feeding back the preferred capability attribute to the user equipment, where the preferred capability attribute includes a non-seamless concurrency capability attribute or a seamless concurrency capability attribute includes:

receiving, by the ANDSF unit, the network capability request that is sent by the user equipment, where the network capability request carries a capability attribute set of the user equipment;

performing, by the ANDSF, matching between a capability attribute on a network side and a capability attribute of the user equipment according to preset capability attribute priorities, to determine the preferred capability attribute; and notifying, by the ANDSF, the user equipment of the preferred capability attribute; and when the preferred capability attribute includes the non-seamless concurrency capability attribute or the seamless concurrency capability attribute, enabling the user equipment to reestablish a service bearer according to the non-seamless concurrency capability attribute or the seamless concurrency capability attribute when a preset occasion occurs.

In a second implementation manner according to the first aspect of the embodiments of the present invention, the ANDSF notifies the user equipment of the preferred capability attribute, and when the preferred capability attribute includes a non-seamless switching attribute or seamless switching, the method further includes:

receiving, by the ANDSF unit, an ISMP request that is sent by the user equipment when the user equipment is in a state in which the non-3GPP network is opened and is not connected to, and the non-3GPP network hotspot information is obtained by scanning;

generating, by the ANDSF unit, an ISMP network selection policy according to a CGI and the non-3GPP network hotspot information that is obtained by scanning, and/or an access center and cell network status information of the non-3GPP network that are carried in the ISMP request;

acquiring, by the ANDSF unit, a list of basic service set identifier BSSIDs of non-3GPP networks that is carried in the ISMP request, and assigning a priority to a BSSID in the BSSID list; and feeding back, by the ANDSF unit to the user equipment, the ISMP network selection policy and the BSSID list having the BSSID to which the priority is assigned, so that the user equipment accesses the non-3GPP network according to the ISMP network selection policy and the assigned BSSID priority.

In a third implementation manner according to the first aspect of the embodiments of the present invention, after the sending, by the ANDSF unit, an instruction for instructing to access the non-3GPP network to the user equipment, and before the receiving, by the ANDSF unit, an ISMP request that is sent by the user equipment when the user equipment is in a state in which the non-3GPP network is opened and is not connected to, and the non-3GPP network hotspot information is obtained by scanning, the method further includes:

receiving, by the ANDSF unit, a discovery information request that is sent by the user equipment;

querying, by the ANDSF unit, a cell list according to a CGI that is carried in the discovery information request; and in a state in which a hotspot exists in a current cell in which the user equipment is located, recommending the non-3GPP network hotspot information for scanning to the user equipment; and feeding back, by the ANDSF, response information to the user equipment, where the response information carries non-3GPP network hotspot information corresponding to 3GPP network information, so that the user equipment turns on the switch of the non-3GPP network, and scans the non-3GPP network hotspot information according to the 3GPP network information.

In a fourth implementation manner according to the first aspect of the embodiments of the present invention, after the sending, by the ANDSF unit, an instruction for instructing to access the non-3GPP network, and an ISRP offloading policy to the user equipment, the method further includes:

initiating, by the ANDSF unit, a procedure of subscribing to multi-dimensional information, to acquire the subscribed multi-dimensional information;

updating, by the ANDSF unit, the ISRP offloading policy according to the subscribed multi-dimensional information; and sending, by the ANDSF unit, the updated ISRP offloading policy to the user equipment, where the initiating, by the ANDSF unit, a procedure of subscribing to multi-dimensional information includes:

initiating, by the ANDSF unit to the access center of the non-3GPP network, subscription to a load status of an access point of the non-3GPP network; or initiating, by the ANDSF unit to a local gateway, subscription to a cell load status; or initiating, by the ANDSF unit to a local gateway, subscription to quality of service information or user-level link quality information; or initiating, by the ANDSF unit to a policy and charging rules function PCRF unit, subscription to a data package/tariff usage status.

A second aspect of the embodiments of the present invention provides a method for service offloading between different networks, including:

sending, by user equipment, a network capability request to an access network discovery and selection function ANDSF unit, where the network capability request carries a capability attribute set of the user equipment, and is used to instruct the ANDSF to perform matching between a capability attribute on a network side and a capability attribute of the user equipment according to preset capability attribute priorities, to determine a preferred capability attribute;

receiving, by the user equipment, the preferred capability attribute that is fed back by the ANDSF unit, and when the preferred capability attribute includes a non-seamless concurrency attribute or a seamless concurrency attribute, reestablishing a service bearer when a preset occasion occurs, where the preset occasion includes that the user equipment detects that a service is paused or a service is stopped, or traffic of the 3GPP network decreases to a threshold;

sending, by the user equipment, an ISRP request to the ANDSF unit by using the 3GPP network, where the ISRP request is used to trigger the ANDSF unit to send an instruction for instructing to access a non-3GPP network, and an ISRP offloading policy to the user equipment;

accessing, by the user equipment, the non-3GPP network according to the instruction for instructing to access the non-3GPP network that is fed back by the ANDSF unit; and allocating, by the user equipment according to the ISRP offloading policy that is fed back by the ANDSF unit, services that separately camp on the 3GPP network and the non-3GPP network, where the instruction for instructing to access the non-3GPP network includes an option that is used to instruct the user equipment to turn on a non-3GPP network opening switch that is used to connect to the non-3GPP network, and hotspot information that is used by the user equipment for scanning and accessing the non-3GPP network.

In a first implementation manner according to the second aspect of the embodiments of the present invention, the method further includes:

receiving, by the user equipment, the preferred capability attribute that is fed back by the ANDSF unit, and when the preferred capability attribute includes a non-seamless switching attribute or a seamless switching attribute, sending, by the user equipment, a discovery information request to the ANDSF unit when the user equipment is in a state in which the non-3GPP network is closed, where the discovery information request carries a CGI, and is used to trigger the ANDSF unit to feed back response information that carries non-3GPP network hotspot information corresponding to 3GPP network information;

receiving, by the user equipment, the response information, turning on the switch of the non-3GPP network, and scanning the non-3GPP network hotspot information according to the 3GPP network information; and sending, by the user equipment, an ISMP request to the ANDSF when the user equipment is in a state in which the non-3GPP network is opened and is not connected to, and the non-3GPP network hotspot information is obtained by scanning, where the ISMP request is used to acquire, from the ANDSF unit, an ISMP network selection policy, and an assigned BSSID priority according to which the non-3GPP network is accessed.

A third aspect of the embodiments of the present invention provides an apparatus for service offloading between different networks, applied to an access network discovery and selection function ANDSF unit, where the apparatus includes:

a capability negotiation module, configured to determine a preferred capability attribute according to a network capability request that is sent by user equipment, and feed back the preferred capability attribute to the user equipment, where the preferred capability attribute includes a non-seamless concurrency capability attribute or a seamless concurrency capability attribute;

a first receiving module, configured to receive an ISRP request that is sent by the user equipment by using a 3GPP network, where the ISRP request is determined according to the preferred capability attribute;

a query module, configured to query, according to a cell global identification CGI that is carried in the ISRP request received by the receiving module, whether a non-3GPP network exists; and a first feedback module, configured to: when the query module finds that the non-3GPP network exists, send an instruction for instructing to access the non-3GPP network, and an ISRP offloading policy to the user equipment, where the ISRP offloading policy is used to indicate services of the user equipment that separately camp on the 3GPP network and the non-3GPP network; and the instruction for instructing to access the non-3GPP network includes an option that is used to instruct the user equipment to turn on a non-3GPP network opening switch that is used to connect to the non-3GPP network, and non-3GPP network hotspot information that is used by the user equipment for scanning and accessing the non-3GPP network.

In a first implementation manner according to the third aspect of the embodiments of the present invention, the capability negotiation module includes:

a second receiving module, configured to receive the network capability request that is sent by the user equipment, where the network capability request carries a capability attribute set of the user equipment;

a preference matching module, configured to perform, according to preset capability attribute priorities, matching between a capability attribute on a network side and a capability attribute of the user equipment that is received by the second receiving module, to determine the preferred capability attribute; and a second feedback module, configured to: notify the user equipment of the preferred capability attribute that is determined by the preference matching module, and when the preferred capability attribute includes the non-seamless concurrency attribute or the seamless concurrency attribute, enable the user equipment to reestablish a service bearer according to the non-seamless concurrency attribute or the seamless concurrency attribute when a preset occasion occurs.

In a second implementation manner according to the third aspect of the embodiments of the present invention, when the preferred capability attribute that is notified by the second feedback module to the user equipment includes a non-seamless switching attribute or seamless switching, the capability negotiation module further includes:

a third receiving module, configured to receive an ISMP request that is sent by the user equipment when the user equipment is in a state in which the non-3GPP network is opened and is not connected to, and the non-3GPP network hotspot information is obtained by scanning;

a policy generation module, configured to generate an ISMP network selection policy according to a CGI and the non-3GPP network information that is obtained by scanning, and/or an access center and cell network status information of the non-3GPP network that are carried in the ISMP request received by the third receiving module;

an assignment module, configured to assign a priority to a BSSID in a BSSID list according to a list of basic service set identifier BSSIDs of non-3GPP networks that is carried in the ISMP request received by the third receiving module; and a third feedback module, configured to feed back, to the user equipment, the ISMP network selection policy that is generated by the policy generation module, and the BSSID list having the BSSID to which the priority is assigned by the assignment module, so that the user equipment accesses the non-3GPP network according to the ISMP network selection policy and the assigned BSSID priority.

In a third implementation manner according to the third aspect of the embodiments of the present invention, the apparatus further includes:

a subscription module, configured to initiate a procedure of subscribing to multi-dimensional information, to acquire the subscribed multi-dimensional information, where the initiating a procedure of subscribing to multi-dimensional information includes: initiating, to the access center of the non-3GPP network, subscription to a load status of an access point of the non-3GPP network; or initiating, to a local gateway, subscription to a cell load status; or initiating, to a local gateway, subscription to quality of service information or user-level link quality information; or initiating, to a policy and charging rules function PCRF unit, subscription to a data package/tariff usage status;

an update module, configured to update the ISRP offloading policy according to the multi-dimensional information that is subscribed by the subscription module; and a fourth feedback module, configured to send, to the user equipment, the ISRP offloading policy that is updated by the update module.

A fourth aspect of the embodiments of the present invention provides an apparatus for service offloading between different networks, applied to user equipment, where the apparatus includes:

a first sending module, configured to send a network capability request to an ANDSF unit, where the network capability request carries a capability attribute set of the user equipment, and is used to instruct the ANDSF to perform matching between a capability attribute on a network side and a capability attribute of the user equipment according to preset capability attribute priorities, to determine a preferred capability attribute;

a fourth receiving module, configured to receive the preferred capability attribute that is fed back by the ANDSF unit;

a bearer reestablishment module, configured to: when the preferred capability attribute received by the fourth receiving module includes a non-seamless concurrency attribute or a seamless concurrency attribute, reestablish a service bearer when a preset occasion occurs, where the preset occasion includes that the user equipment detects that a service is paused or a service is stopped, or traffic of the 3GPP network decreases to a threshold;

a second sending module, configured to send an ISRP request to the access network discovery and selection function ANDSF unit by using the 3GPP network, where the ISRP request is used to trigger the ANDSF unit to send an instruction for instructing to access a non-3GPP network, and an ISRP offloading policy to the user equipment;

an access module, configured to access the non-3GPP network according to the instruction for instructing to access the non-3GPP network that is fed back by the ANDSF unit; and an allocation module, configured to allocate, according to the ISRP offloading policy that is fed back by the ANDSF unit, services that separately camp on the 3GPP network and the non-3GPP network, where the instruction for instructing to access the non-3GPP network includes an option that is used to instruct the user equipment to turn on a non-3GPP network opening switch that is used to connect to the non-3GPP network, and hotspot information that is used by the user equipment for scanning and accessing the non-3GPP network.

In a first implementation manner according to the fourth aspect of the embodiments of the present invention, the apparatus further includes:

a third sending module, configured to: when the preferred capability attribute received by the fourth receiving module includes a non-seamless switching attribute or a seamless switching attribute, send a discovery information request to the ANDSF unit when the user equipment is in a state in which the non-3GPP network is closed, where the discovery information request carries a CGI, and is used to trigger the ANDSF unit to feed back response information that carries non-3GPP network hotspot information corresponding to 3GPP network information;

a scanning module, configured to receive the response information, turn on the switch of the non-3GPP network, and scan the non-3GPP network hotspot information according to the 3GPP network information; and an ISMP request sending module, configured to send an ISMP request to the ANDSF when the user equipment is in a state in which the non-3GPP network is opened and is not connected to, and the non-3GPP network hotspot information is obtained by scanning, where the ISMP request is used to acquire, from the ANDSF unit, an ISMP network selection policy, and an assigned BSSID priority according to which the non-3GPP network is accessed.

As can be learned from the foregoing technical solutions, compared with the prior art, the embodiments of the present invention disclose a method and an apparatus for service offloading between different networks. In the embodiments of the present invention, by means of capability negotiation between an ANDSF unit and user equipment, a network side controls the user equipment to send an ISRP request to the ANDSF unit; a non-3GPP network is accessed by using an instruction, generated by the ANDSF unit according to the ISRP request, for instructing to access the non-3GPP network; and after the user equipment is simultaneously connected to a 3GPP network and the non-3GPP network, services of the user equipment that camp on the 3GPP network and services of the user equipment that camp on the non-3GPP network are indicated according to an ISRP offloading policy that is delivered by the ANDSF unit according to the ISRP request. According to the foregoing process, an ISRP offloading policy is independently performed without first performing an ISMP procedure, to offload a service on a 3GPP network, thereby implementing that a network side controls user equipment to initiate an ISRP procedure by means of capability negotiation, and achieving an objective of saving a network resource in a service offloading process.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
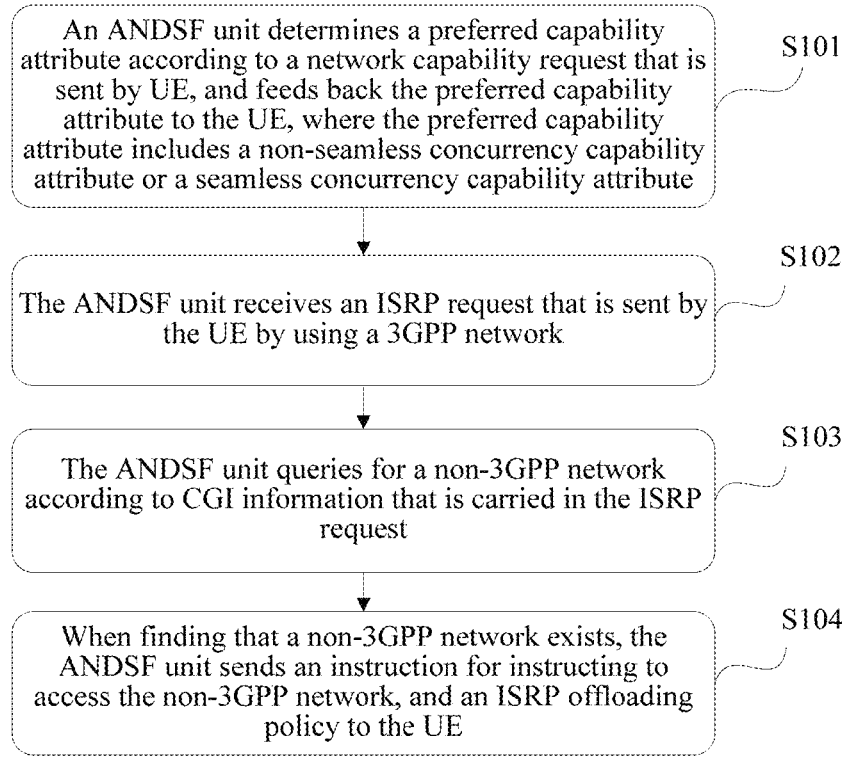
FIG. 1 is a flowchart of a method for service offloading between different networks according to Embodiment 1 of the present invention.

For reference and clarity, descriptions, and acronyms or abbreviations of technical terms used in the following text are summarized as follows:

ANDSF: Access Network Discovery and Selection Function, access network discovery and selection function;

AP: Access Point, WLAN access point; and AC: Access Center, WLAN access center;

3GPP: 3rd Generation Partnership Project, 3rd generation partnership project;

API: Application Programming Interface, application programming interface;

CDMA: Code Division Multiple Access, Code Division Multiple Access;

GSM: Global System for Mobile Communications, Global System for Mobile Communications;

LTE: Long Term Evolution, Long Term Evolution; and P-GW: PDN Gateway, PDN gateway;

PMIP: Proxy Mobile IP, proxy mobile IP; and UE: User Equipment, user equipment;

UMTS: Universal Mobile Telecommunications System, Universal Mobile Telecommunications System;

WLAN: Wireless Local Area Networks, wireless local area network;

WiMAX: Worldwide Interoperability for Microwave Access, Worldwide Interoperability for Microwave Access;

APN: access point name, access point name; and APP: Application, application;

GGSN: gateway GPRS support node, gateway GPRS support node;

ISMP: Inter-system Mobility Policy, inter-system mobility policy;

ISRP: Inter-system Routing Policy, inter-system routing policy;

IMSI: international mobile subscriber identity, international mobile subscriber identity;

CGI: cell global identification, cell global identification;

SSID: service set identifier, service set identifier;

BSSID: basic service set identifier, basic service set identifier; and

RSSI: received signal strength indicator, received signal strength indicator.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

As can be learned from the background, in the prior art, UE is required to first initiate an ISMP procedure before services are offloaded to a 3GPP network and a non-3GPP network (for example, a WLAN network), but the UE does not execute offloading, and the ISMP procedure is used only to join a non-3GPP network (for example, a WLAN network). Therefore, in the prior art, the ISMP procedure must be performed before an ISRP procedure is initiated, and as a result, excessive network resources are occupied.

Therefore, the embodiments of the present invention disclose a method and an apparatus for service offloading between different networks. By means of capability negotiation between an ANDSF unit and UE, a network side controls the UE to send an ISRP request to the ANDSF unit; a non-3GPP network is accessed by using an instruction, generated by the ANDSF unit according to the ISRP request, for instructing to access the non-3GPP network; and after the UE is simultaneously connected to a 3GPP network and the non-3GPP network, services of the user equipment that camp on the 3GPP network and services of the user equipment that camp on the non-3GPP network are indicated according to an ISRP offloading policy that is delivered by the ANDSF unit according to the ISRP request. According to the foregoing process, an ISRP offloading policy is independently performed without first performing an ISMP procedure, to offload a service on a 3GPP network, thereby implementing that a network side controls user equipment to initiate an ISRP procedure by means of capability negotiation, and achieving an objective of saving a network resource in a service offloading process. A specific process is described in detail by using the following embodiments of the present invention.

Embodiment 1

FIG. 1 is a flowchart of a method for service offloading between different networks according to Embodiment 1 of the present invention. The method is applied to an ANDSF unit on a network side, and mainly includes the following steps:

Step S101: An ANDSF unit determines a preferred capability attribute according to a network capability request (Network Capability Request) that is sent by UE, and feeds back the preferred capability attribute to the UE, where the preferred capability attribute includes a non-seamless concurrency capability attribute or a seamless concurrency capability attribute.

In step S101, the ANDSF unit receives the network capability request that is sent by the UE, performs capability negotiation, and feeds back, to the UE, a result that is obtained after capability negotiation; and in this way, a network side controls subsequent behavior of the UE. In a process of performing step S101, when the determined preferred capability attribute is either of the non-seamless concurrency capability attribute and the seamless concurrency capability attribute, the UE is triggered to send an ISRP request to the ANDSF unit.

Step S102: The ANDSF unit receives an ISRP request that is sent by the UE by using a 3GPP network, where the ISRP request is determined according to the preferred capability attribute.

In a process of performing step S102, the ISRP request received by the ANDSF unit carries IMSI and CGI information of the UE. The ISRP request is mainly used to request for services that camp on the 3GPP network and services that camp on a non-3GPP network if the UE is simultaneously connected to the 3GPP network and the non-3GPP network.

Step S103: The ANDSF unit queries for a non-3GPP network according to CGI information that is carried in the ISRP request; if it is found that a non-3GPP network exists, the ANDSF unit performs step S104; and if it is found that no non-3GPP network exists, the ANDSF unit does not perform the ISRP request.

In a process of performing step S103, the ANDSF unit queries, according to the CGI, whether a non-3GPP network exists. In this embodiment of the present invention, a WiFi network is used as the non-3GPP network for description, but the non-3GPP network is not limited thereto. The non-3GPP network includes a WiFi network, a CDMA network, a WiMAX network, or the like, and this method is also applicable when the non-3GPP network is the CDMA network or the WiMAX network.

If the ANDSF unit finds a non-3GPP network, the ANDSF performs step S104. If the ANDSF unit finds that no non-3GPP network exists, the ANDSF unit responds to the UE that no non-3GPP network exists in an area in which the UE is currently located, and a service on the 3GPP network cannot be offloaded; therefore, the ANDSF unit delivers no ISRP offloading policy to the UE. The ANDSF unit queries again for a non-3GPP network in the current area according to changed CGI information only after the UE re-sends the ISRP request when the CGI information changes.

Step S104: The ANDSF unit sends an instruction for instructing to access the non-3GPP network, and an ISRP offloading policy to the UE.

In step S104, the ISRP offloading policy is used to indicate services of the UE that separately camp on the 3GPP network and the non-3GPP network, and the instruction for accessing the non-3GPP network includes an option that is used to instruct the UE to turn on a non-3GPP network opening switch that is used to connect to the non-3GPP network, and non-3GPP network hotspot information that is used by the UE for scanning and accessing the non-3GPP network.

It should be noted that the ISRP offloading policy may be set according to a specific case. For example, based on an existing service carried on the UE, a default ISRP offloading policy is shown in the following Table 1:

TABLE 1

| Application (service) | preferentially selected network |
|---|---|
| WeChat | 3GPP |
| Sina Weibo | 3GPP |
| Youtube | WLAN |

In this embodiment of the present invention, by means of capability negotiation between an ANDSF unit and UE, a network side controls the UE to send an ISRP request, and the ANDSF unit receives the ISRP request that is sent by the UE, queries for a non-3GPP network, generates, according to the ISRP request, an instruction for instructing the UE to access the non-3GPP network, to access the non-3GPP network, and delivers an ISRP offloading policy according to the ISRP request, to indicate services of the UE that camp on a 3GPP network and services of the UE that camp on the non-3GPP network. According to the foregoing process, an ISRP offloading policy is independently performed without first performing an ISMP procedure, to offload a service on a 3GPP network, thereby implementing that a network side controls user equipment to initiate an ISRP procedure by means of capability negotiation, and achieving an objective of saving a network resource in a service offloading process.

Embodiment 2

Figure 2:
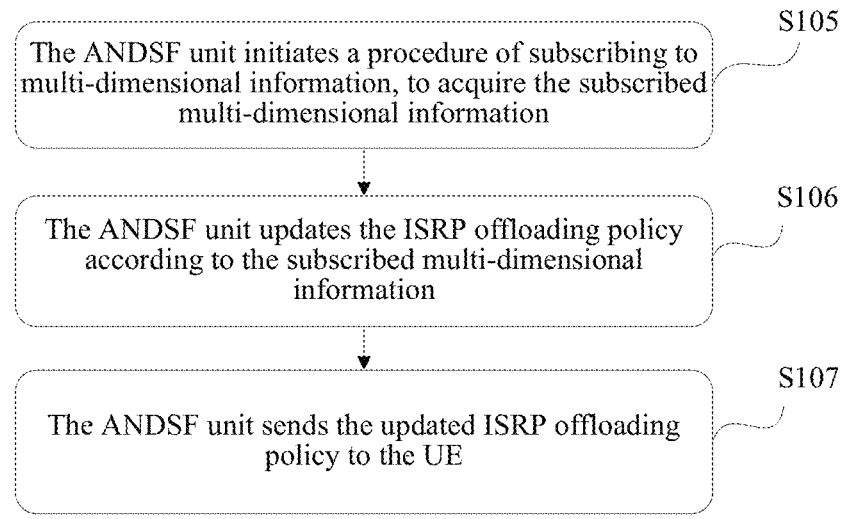
FIG. 2 shows a procedure of updating an ISRP offloading policy according to Embodiment 2 of the present invention.

Based on a method for service offloading between different networks disclosed in Embodiment 1 of the present invention, after step S104 is performed in FIG. 1, Embodiment 2 of the present invention further discloses a procedure of updating the ISRP offloading policy. As shown in FIG. 2, the procedure mainly includes the following steps:

Step S105: The ANDSF unit initiates a procedure of subscribing to multi-dimensional information, to acquire the subscribed multi-dimensional information.

In step S105, the multi-dimensional information includes information such as a network load (load) status, a data package/tariff status, and quality of service, and in a subscription process of the ANDSF unit, the ANDSF unit may subscribe to any one piece of the foregoing information, or may simultaneously subscribe to multiple pieces of the foregoing information.

The initiating, by the ANDSF unit, a procedure of subscribing to multi-dimensional information includes:

initiating, by the ANDSF unit to an access center of the non-3GPP network, subscription to a load status of an access point of the non-3GPP by means of activation of an Enabler, where when the non-3GPP is a WiFi network, the ANDSF unit initiates, to an AC of the WiFi network, subscription to a load status of an AP; or initiating, by the ANDSF unit to a local gateway (GGSN/PGW), subscription to a cell load status by means of activation of an Enabler; or initiating, by the ANDSF unit to a local gateway (GGSN/PGW), subscription to quality of service information or user-level link quality information by means of activation of an Enabler; or initiating, by the ANDSF unit to a policy and charging rules function PCRF unit, subscription to a data package/tariff usage status by means of activation of an Enabler.

Step S106: The ANDSF unit updates the ISRP offloading policy according to the subscribed multi-dimensional information.

In a process of performing step S106, after the ANDSF unit updates the ISRP offloading policy according to the subscribed multi-dimensional information, based on the example in the foregoing Table 1, the updated ISRP offloading policy is shown in Table 2 as follows:

TABLE 2

| Application (service) | preferentially selected network |
|---|---|
| WeChat | 3GPP |
| Sina Weibo | WLAN |
| Youtube | WLAN |

As can be learned from a comparison between the foregoing Table 1 and Table 2, network selection (bearer) of the "Sina Weibo" service of the UE is changed. On this basis, it can be learned that the updated ISRP offloading policy indicates a change in network selection of a service of the UE.

Step S107: The ANDSF unit sends the updated ISRP offloading policy to the UE.

In a process of performing step S107, the ANDSF unit sends the updated ISRP offloading policy to the UE, so that the UE updates network selection of a service according to the new ISRP offloading policy. As described in the foregoing example, WeChat and YouTube still camp on the original networks, but Sina Weibo switches from the 3GPP network to a WLAN network.

According to the method for updating an ISRP offloading policy disclosed in Embodiment 2 of the present invention, after an ANDSF unit delivers an updated ISRP offloading policy to UE, the UE is instructed to change original service network selection. Similarly, an ISRP offloading policy can be independently performed without first performing an ISMP procedure, to offload a service on a 3GPP network, thereby implementing that a network side controls user equipment to initiate an ISRP procedure by means of capability negotiation, and achieving an objective of saving a network resource in a service offloading process. In addition, it is more convenient and diversified for the UE to change a network that carries a service.

Embodiment 3

Figure 3:
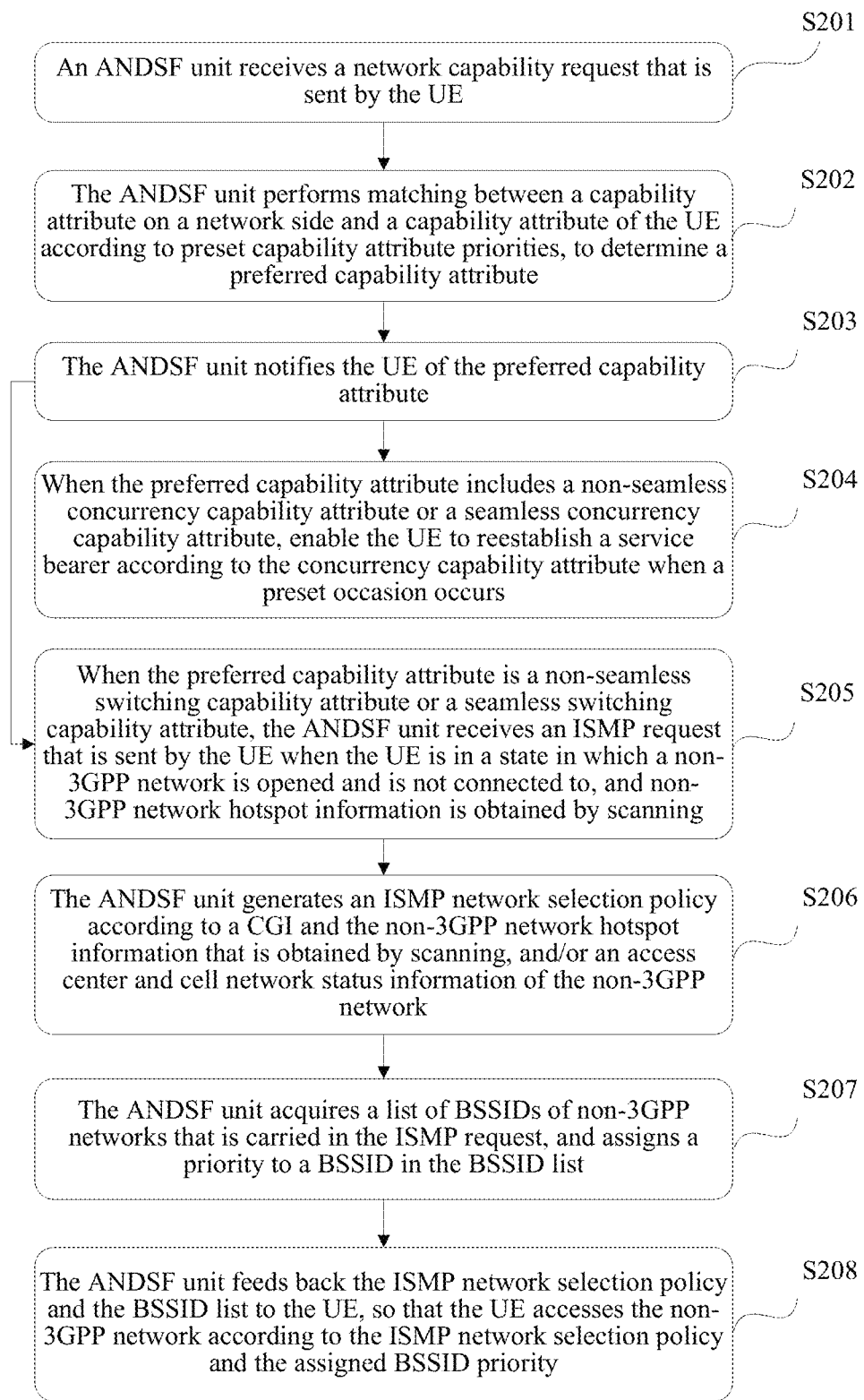
FIG. 3 is a flowchart showing that a UE side and a network side perform capability negotiation to determine to perform an ISRP procedure or an ISMP procedure according to Embodiment 3 of the present invention.

Based on Embodiment 1 and Embodiment 2 of the present invention, after step S101 shown in FIG. 1, this embodiment of the present invention discloses that a UE side and a network side perform capability negotiation to determine to perform an ISRP procedure for offloading or an ISMP procedure for network selection. When the preferred capability attribute in step S101 includes the non-seamless concurrency capability attribute or the seamless concurrency capability attribute, it is determined that the ISRP procedure for offloading is subsequently performed. Specifically, as shown in FIG. 3, the following steps are mainly included:

Step S201: The ANDSF unit receives a network capability request (Network Capability Request) that is sent by the UE, where the network capability request carries a capability attribute set of the UE.

In step S201, capability attributes in the capability attribute set of the UE include: a seamless concurrency capability attribute, a non-seamless concurrency capability attribute, a seamless switching capability attribute, and a non-seamless switching capability attribute.

The seamless concurrency capability attribute refers to that a service simultaneously camps on a 3GPP network and a non-3GPP network (for example, a WiFi network), and a service is not interrupted when the service switches between the 3GPP network and the non-3GPP network.

The non-seamless concurrency capability attribute refers to that a service simultaneously camps on a 3GPP network and a non-3GPP network (for example, a WiFi network), and a service is interrupted when the service switches between the 3GPP network and the non-3GPP network (all services camp only on one network at a same time).

The seamless switching capability attribute refers to that all services camp only on one network at a same time, and a service is not interrupted when the service switches between a 3GPP network and a non-3GPP network.

The non-seamless switching capability attribute refers to that all services camp only on one network (a 3GPP network or a non-3GPP network) at a same time, and a service is interrupted when the service switches between the 3GPP network and the non-3GPP network.

Step S202: The ANDSF unit performs matching between a capability attribute on a network side and a capability attribute of the UE according to preset capability attribute priorities, to determine a preferred capability attribute.

In a process of performing step S202, the ANDSF unit receives the Network Capability Request of the UE, and the ANDSF performs matching between a capability attribute (for example, the non-seamless switching capability attribute, the seamless switching capability attribute, or the non-seamless concurrency capability attribute) on the network side and a capability attribute of the UE according to the capability attribute (for example, the non-seamless switching capability attribute, the seamless switching capability attribute, or the non-seamless concurrency capability attribute) supported by the network side. In a specific matching process, matching is performed according to the preset capability attribute priorities, where the preset capability attribute priorities are: the seamless concurrency capability attribute, the non-seamless concurrency capability attribute, the seamless switching capability attribute, and the non-seamless switching capability attribute from high to low. Configuration (matching) is performed according to the foregoing preset priority sequence.

It should be noted that in a matching process, if the UE supports the non-seamless concurrency capability attribute and the non-seamless switching capability attribute, and the network side supports the non-seamless switching capability attribute, the seamless switching capability attribute, and the non-seamless concurrency capability attribute, the non-seamless concurrency capability attribute is preferentially selected according to a matching result (a result of capability negotiation) of capability attribute priorities. If the UE supports the non-seamless concurrency capability attribute and the non-seamless switching capability attribute, and the network side supports only the non-seamless switching capability attribute, only the non-seamless switching capability attribute can be selected according to a matching result (a result of capability negotiation) of capability attribute priorities.

Therefore, in an entire matching process, the preferred capability attribute to be notified to the UE may be finally determined according to the result of capability negotiation between the UE side and the network side.

Step S203: The ANDSF unit notifies the UE of the preferred capability attribute.

In a process of performing step S203, the preferred capability attribute determined by performing step S202 is notified to the UE. Multiple cases exist for the capability attribute. If a matching result is a concurrency attribute, the ISRP procedure for offloading is performed; if a matching result is a switching attribute, the ISMP procedure for network selection is performed. In view of this, the following steps are performed.

Step S204: When the preferred capability attribute includes a non-seamless concurrency capability attribute or a seamless concurrency capability attribute, enable the UE to reestablish a service bearer according to the non-seamless concurrency capability attribute or the seamless concurrency capability attribute when a preset occasion occurs.

As can be learned in a process of performing step S204, the preferred capability attribute that is determined by performing step S203 and that is notified to the UE is a concurrency attribute, the concurrency attribute may be the non-seamless concurrency capability attribute or the seamless concurrency capability attribute, and both of the non-seamless concurrency capability attribute and the seamless concurrency capability attribute can trigger the ISRP procedure for offloading. The preset occasion in step S204 includes that the UE detects that a service is paused or a service is stopped, or the UE detects that network traffic already decreases to a threshold such as 1 kbps. When any one of the foregoing preset occasions occurs, the UE is triggered to reestablish a service bearer.

When step S203 is performed, the ANDSF unit notifies the UE of the preferred capability attribute. If the preferred capability attribute determined in step S204 is the non-seamless concurrency capability attribute, a specific process in which the UE reestablishes, when the preset occasion occurs, a service bearer according to the non-seamless concurrency capability attribute that is fed back by the ANDSF unit is:

when the preset occasion occurs, the UE disconnects a bearer originally established by an APN, and reestablishes a bearer by using a converged APN, to ensure that although connected to a non-3GPP network, the UE can still perform data access by using a 3GPP network (where for an Android system, a multimedia message APN is used, and when connected to a non-3GPP network (for example, a WLAN network), the UE can still perform data connection by means of the multimedia message APN by using a 3GPP network); or if the UE can also access an ANDSF Server by using a corporate APN, the UE does not disconnect a bearer originally established by an APN.

It should be noted that after the UE reestablishes a bearer, the UE sends, to the ANDSF unit, an ISRP request that carries user IMSI and CGI information, that is, return to perform step S102 disclosed in Embodiment 1 of the present invention.

Step S205: When the preferred capability attribute includes a non-seamless switching capability attribute or a seamless switching capability attribute, the ANDSF unit receives an ISMP request that is sent by the UE when the UE is in a state in which a non-3GPP network is opened and is not connected to, and a hotspot of the non-3GPP network is obtained by scanning.

In a process of performing step S205, the preferred capability attribute that is determined by performing step S203 and that is notified to the UE is a switching capability attribute, the switching capability attribute may be the non-seamless switching capability attribute or the seamless switching capability attribute, and both of the two can trigger the ISMP procedure for network selection. If the determined preferred capability attribute is the non-seamless switching capability attribute, the ANDSF unit receives the ISMP request that is sent by the UE. In this case, the UE is in a state in which the non-3GPP network is opened but is not connected to, and the UE obtains non-3GPP network hotspot information by scanning.

Step S206: The ANDSF unit generates an ISMP network selection policy according to a CGI and the non-3GPP network information that is obtained by scanning, and/or an access center and cell network status information of the non-3GPP network that are carried in the ISMP request.

In step S206, the non-3GPP network information that is obtained by scanning includes a BSSID, an SSID, and an RSSI in WLAN network information.

In a process of performing step S206, the ISMP network selection policy is generated according to the CGI and the non-3GPP network information that is obtained by scanning, or the access center (for example, for a WiFi network, an access point is an AP) and the cell network status information of the non-3GPP network that are carried in the ISMP request; or the ISMP network selection policy is generated with reference to the CGI, the non-3GPP network hotspot information that is obtained by scanning, and the access center and the cell network status information of the non-3GPP network.

Step S207: The ANDSF unit acquires a list of BSSIDs of non-3GPP networks that is carried in the ISMP request, and assigns a priority to a BSSID in the BSSID list.

In a process of performing step S207, a priority is assigned to a BSSID that is stored in the list of the BSSIDs of the non-3GPP networks that is carried in the ISMP request, to determine, for subsequent use, the priority of the BSSID that is stored in the BSSID list.

Step S208: The ANDSF unit feeds back, to the UE, the ISMP network selection policy and the BSSID list having the BSSID to which the priority is assigned, so that the UE accesses the non-3GPP network according to the ISMP network selection policy and the assigned BSSID priority.

In a process of performing step S208, the ISMP network selection policy and the BSSID list having the BSSID to which the priority is assigned are fed back to the UE, where the ISMP network selection policy and the BSSID list are acquired in a process of performing step S206 and step S207; the UE saves the ISMP policy after receiving the ISMP policy, and feeds back, to the ANDSF unit, acknowledgment information indicating receiving; and the UE accesses the non-3GPP network (for example, a WiFi network) according to the ISMP network selection policy and the BSSID priority assigned by the ANDSF unit.

Figure 4:
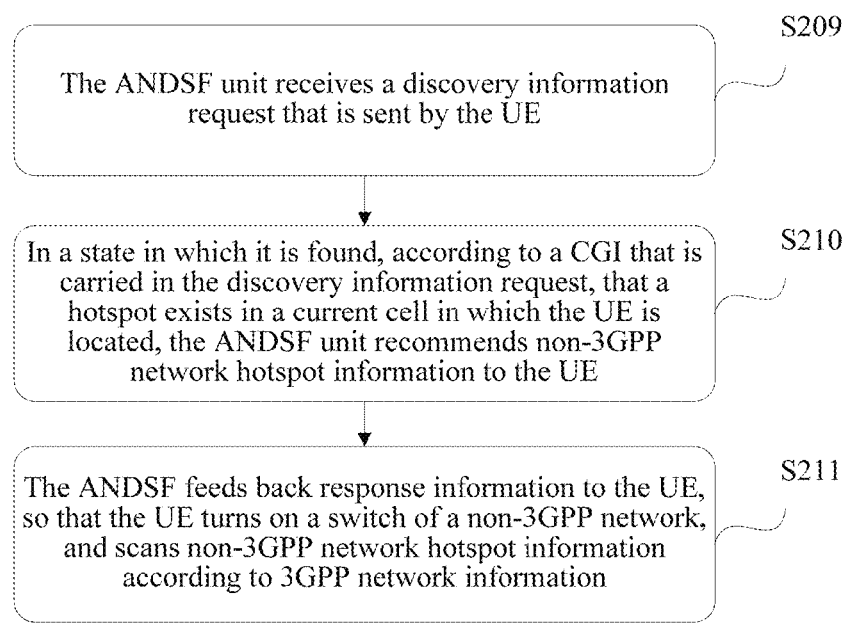
FIG. 4 is a partial flowchart showing that a UE side and a network side perform capability negotiation to determine to perform an ISMP procedure according to Embodiment 3 of the present invention.

It should be noted that after step S204 is performed, and before step S205 is performed, as shown in FIG. 4, the following steps are further included:

Step S209: The ANDSF unit receives a discovery information request (Discovery Information Request) that is sent by the UE.

Step S210: The ANDSF unit queries a cell list according to a CGI that is carried in the discovery information request, and recommends, in a state in which a hotspot exists in a current cell in which the UE is located, non-3GPP network hotspot information for scanning to the UE.

Step S211: The ANDSF feeds back response information to the UE, where the response information carries non-3GPP network hotspot information corresponding to 3GPP network information, so that the UE turns on the switch of the non-3GPP network, and scans a hotspot of the non-3GPP network according to the 3GPP network information.

It should be noted that in the foregoing process, it is mainly considered whether the non-3GPP network (for example, a WiFi network) on the UE side is in a state of being opened and not connected to. If an initial state is that the UE is in a state in which the non-3GPP network is opened and is not connected to, the UE may directly perform, in a state in which the UE obtains non-3GPP network hotspot information by scanning, the step of sending the ISMP request; or if an initial state is not that the UE is in a state in which the non-3GPP network is opened and is not connected to, the step of sending the ISMP request needs to be performed after step S209 to step S211 are first performed.

In this embodiment of the present invention, capability negotiation between UE and a network side is performed, to determine whether the UE performs an ISRP procedure for offloading, or performs an ISMP procedure for network selection. In this embodiment of the present invention, according to the foregoing process, the ISRP procedure for offloading is independent from the ISMP procedure for network selection, and the ISRP procedure does not need to be performed only after the ISMP procedure is performed, which is unlike the prior art. With reference to Embodiment 1 of the present invention and Embodiment 2 of the present invention, an ANDSF unit receives an ISRP request that is sent by UE, queries for a non-3GPP network, generates, according to the ISRP request, an instruction for instructing the UE to access the non-3GPP network, to access the non-3GPP network, and delivers an ISRP offloading policy according to the ISRP request, to indicate services of the UE that camp on a 3GPP network and services of the UE that camp on the non-3GPP network. According to the foregoing process, an ISRP offloading policy is independently performed without first performing an ISMP procedure, to offload a service on a 3GPP network, thereby implementing that a network side controls user equipment to initiate an ISRP procedure by means of capability negotiation, and achieving an objective of saving a network resource in a service offloading process.

Moreover, in this embodiment of the present invention, the ISRP procedure and the ISMP procedure are determined by means of capability negotiation, so that extension is easily performed, and behavior of a terminal side can be controlled by a network side. In addition, service concurrent offloading is implemented by setting an APP on a UE side and deploying a converged APN on the network side, which is universally applicable to UEs, and is easy for popularization and deployment. Furthermore, network quality or quality of service is used as one factor for a closed-loop policy, which can further improve service experience of a user.

Embodiment 4

Figure 5:
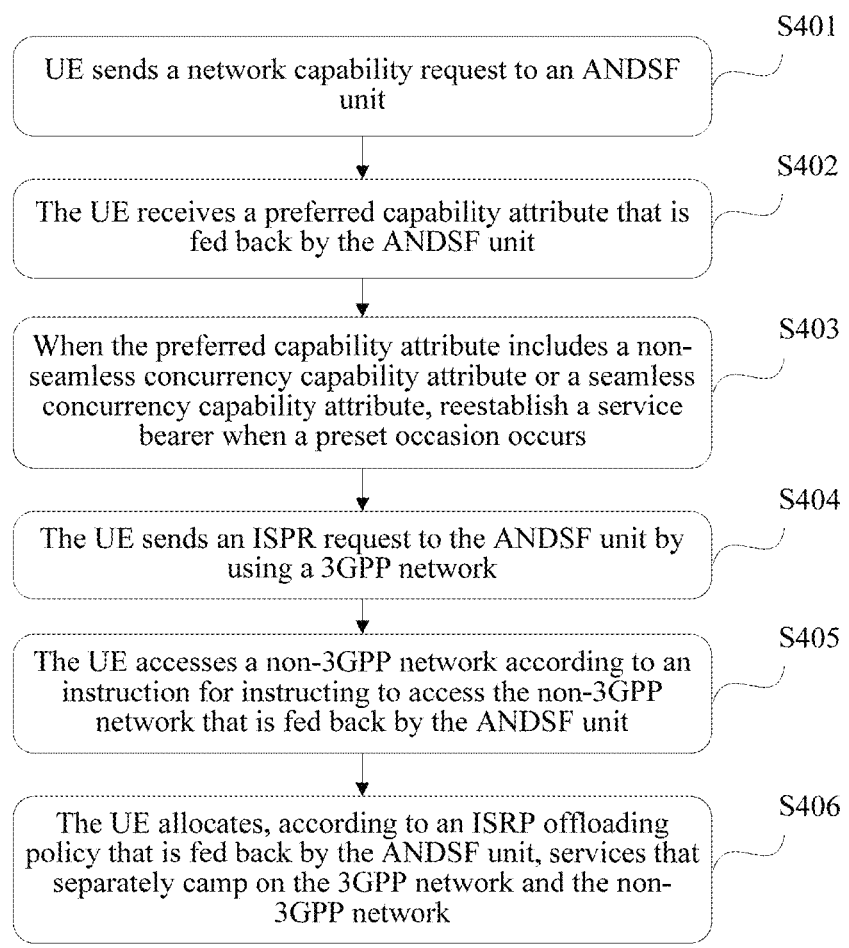
FIG. 5 is a flowchart of a method for service offloading between different networks according to Embodiment 4 of the present invention.

FIG. 5 is a flowchart of a method for service offloading between different networks according to Embodiment 4 of the present invention. The method is applied to a UE side, where it is already preset that the UE installs and runs an APP that uses the method, and the method mainly includes the following steps:

Step S401: UE sends a network capability request (Network Capability Request) to the ANDSF unit.

In step S401, the network capability request carries a capability attribute set of the UE, and capability attributes in the capability attribute set of the UE include: a seamless concurrency capability attribute, a non-seamless concurrency capability attribute, a seamless switching capability attribute, and a non-seamless switching capability attribute.

The ANDSF unit performs matching between a capability attribute on a network side and a capability attribute of the UE according to preset capability attribute priorities, to determine a preferred capability attribute, where for specific meaning of the capability attributes, reference may be made to the explanation and description of step S201 in Embodiment 3 of the present invention.

For a process of priority matching of the ANDSF unit, reference may be made to the explanation and description of step S202 in Embodiment 3 of the present invention.

Step S402: The UE receives the preferred capability attribute that is fed back by the ANDSF unit.

In a process of performing step S402, the preferred capability attribute notified by the ANDSF unit is received. There are multiple types of capability attributes; and if a matching result is a concurrency attribute, an ISRP procedure for offloading is performed; and if a matching result is a switching attribute, an ISMP procedure for network selection is performed. In view of this, the following steps are performed.

Based on the foregoing manner of capability negotiation, it is determined whether the UE performs the ISRP procedure for offloading, or performs the ISMP procedure for network selection. In this embodiment of the present invention, according to the foregoing process, the ISRP procedure for offloading is independent from the ISMP procedure for network selection, and the ISRP procedure does not need to be performed only after the ISMP procedure is performed, which is unlike the prior art, thereby achieving an objective of saving a network resource.

Step S403: When the preferred capability attribute includes a non-seamless concurrency capability attribute or a seamless concurrency capability attribute, reestablish a service bearer when a preset occasion occurs.

The preset occasion in step S403 includes that the UE detects that a service is paused or a service is stopped, or the UE detects that network traffic already decreases to a threshold such as 1 kbps. When any one of the foregoing preset occasions occurs, the UE is triggered to reestablish a bearer in a manner of a converged APN.

Step S404: The UE sends an ISRP request to the ANDSF unit by using a 3GPP network, where the ISRP request is used to trigger the ANDSF unit to send an instruction for instructing to access a non-3GPP network, and an ISRP offloading policy to the UE.

In step S404, the ISRP request carries IMSI and CGI information of the UE. The ISRP request may trigger the ANDSF unit to send an instruction for instructing to access the non-3GPP network, and an ISRP offloading policy to the UE. Specifically, the ISRP request is mainly used to request for services that camp on the 3GPP network and services that camp on the non-3GPP network if the UE is simultaneously connected to the 3GPP network and the non-3GPP network.

Step S405: The UE accesses the non-3GPP network according to the instruction for instructing to access the non-3GPP network that is fed back by the ANDSF unit.

In step S405, the instruction for instructing to access the non-3GPP network that is fed back by the ANDSF unit includes an option that is used to instruct the UE to turn on a non-3GPP network opening switch that is used to connect to the non-3GPP network, and non-3GPP network hotspot information that is used by the UE for scanning and accessing the non-3GPP network.

The UE accesses the non-3GPP network according to the instruction for instructing to access the non-3GPP network that is fed back.

Step S406: The UE allocates, according to the ISRP offloading policy that is fed back by the ANDSF unit, services that separately camp on the 3GPP network and the non-3GPP network.

In step S406, the ISRP offloading policy that is fed back by the ANDSF unit may be set according to an actual case. For example, based on an existing service carried on the UE, a default ISRP offloading policy is shown in the foregoing Table 1.

It should be noted that after performing step S406, the UE sends, to the ANDSF unit, information that replies whether the non-3GPP network is accessed.

In this embodiment of the present invention, a network side controls UE to send an ISRP request to an ANDSF unit, and the ANDSF unit queries for a non-3GPP network, generates, according to the ISRP request, an instruction for instructing the UE to access the non-3GPP network, to access the non-3GPP network, and delivers an ISRP offloading policy according to the ISRP request, to indicate services of the UE that camp on a 3GPP network and services of the UE that camp on the non-3GPP network. According to the foregoing process, an ISRP offloading policy is independently performed without first performing an ISMP procedure, to offload a service on a 3GPP network, thereby implementing that a network side controls user equipment to initiate an ISRP procedure by means of capability negotiation, and achieving an objective of saving a network resource in a service offloading process.

Embodiment 5

Figure 6:
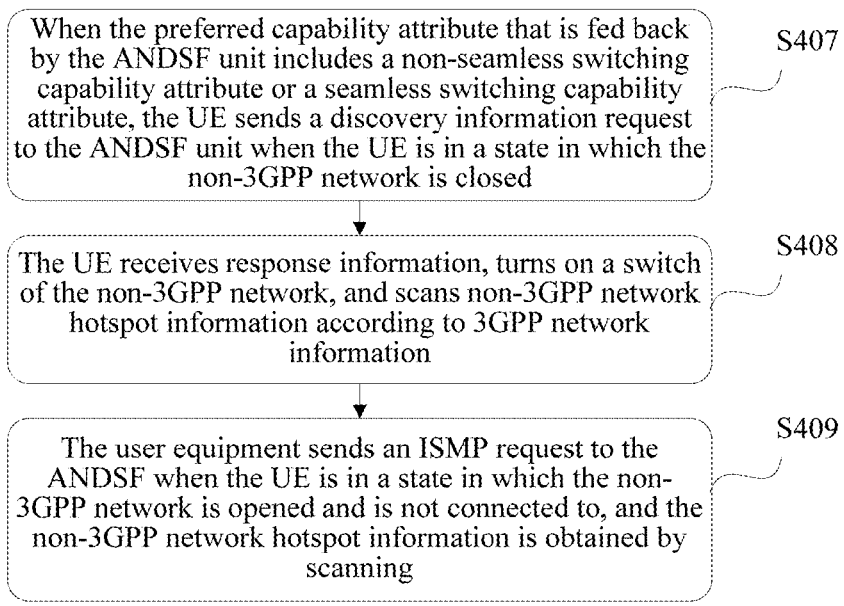
FIG. 6 is a flowchart showing that a UE side and a network side perform capability negotiation to determine to perform an ISRP procedure or an ISMP procedure according to Embodiment 5 of the present invention.

Based on a method for service offloading between different networks according to Embodiment 4 of the present invention, after step S402 is performed, Embodiment 5 of the present invention further discloses that UE and a network side perform capability negotiation to determine to perform an ISRP procedure for offloading or an ISMP procedure for network selection. Specifically, as shown in FIG. 6, the following steps are mainly included:

Step S407: The UE receives the preferred capability attribute that is fed back by the ANDSF unit; and when the preferred capability attribute includes a non-seamless switching attribute or a seamless switching attribute, the UE sends a discovery information request (Discovery Information Request) to the ANDSF unit when the UE is in a state in which the non-3GPP network is closed.

In step S407, the discovery information request carries a CGI, and is used to trigger the ANDSF unit to feed back response information that carries non-3GPP network hotspot information corresponding to 3GPP network information. In this case, the UE is in a state in which the non-3GPP network is closed, and it indicates that the UE does not open, in an initial state, the non-3GPP network.

Step S408: The UE receives the response information, turns on a switch of the non-3GPP network, and scans a hotspot of the non-3GPP network according to the 3GPP network information.

Step S409: The user equipment sends an ISMP request to the ANDSF when the UE is in a state in which the non-3GPP network is opened and is not connected to, and the non-3GPP network hotspot information is obtained by scanning.

During performing of step S409, the ISMP request is used to acquire, from the ANDSF unit, an ISMP network selection policy, and an assigned BSSID priority according to which the non-3GPP network is accessed.

With reference to content disclosed in Embodiment 1 of the present invention to Embodiment 4 of the present invention, in Embodiment 5 of the present invention, a network side controls UE to send an ISRP request to an ANDSF unit, and the ANDSF unit receives the ISRP request that is sent by the UE, queries for a non-3GPP network, generates, according to the ISRP request, an instruction for instructing the UE to access the non-3GPP network, to access the non-3GPP network, and delivers an ISRP offloading policy according to the ISRP request, to indicate services of the UE that camp on a 3GPP network and services of the UE that camp on the non-3GPP network. According to the foregoing process, an ISRP offloading policy is independently performed without first performing an ISMP procedure, to offload a service on a 3GPP network, thereby implementing that a network side controls user equipment to initiate an ISRP procedure by means of capability negotiation, and achieving an objective of saving a network resource in a service offloading process.

Embodiment 6

Figure 7:
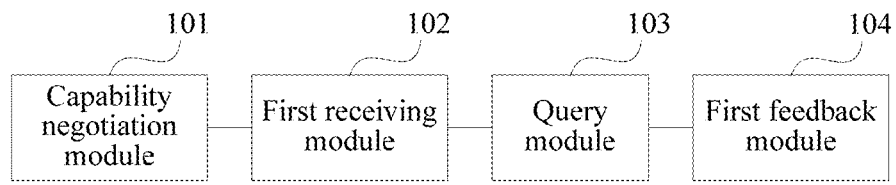
FIG. 7 is a schematic structural diagram of an apparatus for service offloading between different networks according to Embodiment 6 of the present invention.

The method for service offloading between different networks disclosed based on Embodiment 1 of the present invention to Embodiment 5 of the present invention may be implemented on multiple apparatuses; therefore, corresponding to Embodiment 1 of the present invention to Embodiment 5 of the present invention, Embodiment 6 of the present invention separately correspondingly discloses an apparatus for service offloading between different networks, and is specifically as follows:

FIG. 7 shows a corresponding apparatus, which corresponds to the method for service offloading between different networks disclosed in Embodiment 1 of the present invention, for service offloading between different networks. The apparatus is applied to an ANDSF unit, and the apparatus mainly includes:

a capability negotiation module 101, configured to determine a preferred capability attribute according to a network capability request that is sent by user equipment, and feed back the preferred capability attribute to the UE, where the preferred capability attribute includes a non-seamless concurrency capability attribute or a seamless concurrency capability attribute;

a first receiving module 102, configured to receive an ISRP request that is sent by the UE by using a 3GPP network, where the ISRP request is determined according to the preferred capability attribute;

a query module 103, configured to query, according to a CGI that is carried in the ISRP request received by the first receiving module 102, whether a non-3GPP network exists; and a first feedback module 104, configured to: when the query module 103 finds that the non-3GPP network exists, send an instruction for instructing to access the non-3GPP network, and an ISRP offloading policy to the UE, where the ISRP offloading policy is used to indicate services of the UE that separately camp on the 3GPP network and the non-3GPP network; and the instruction for instructing to access the non-3GPP network includes an option that is used to instruct the UE to turn on a non-3GPP network opening switch that is used to connect to the non-3GPP network, and non-3GPP network hotspot information that is used by the UE for scanning and accessing the non-3GPP network.

For specific execution processes of the foregoing modules, reference may be made to related content disclosed in Embodiment 1 of the present invention, and details are not described herein again.

Figure 8:
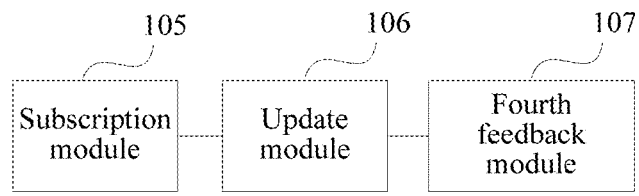
FIG. 8 is a schematic structural diagram of another apparatus for service offloading between different networks according to Embodiment 6 of the present invention.

Corresponding to the method for service offloading between different networks disclosed in Embodiment 2 of the present invention, as shown in FIG. 8, the apparatus further includes:

a subscription module 105, configured to initiate a procedure of subscribing to multi-dimensional information, to acquire the subscribed multi-dimensional information, where the initiating a procedure of subscribing to multi-dimensional information includes: initiating, to an access center of the non-3GPP network, subscription to a load status of an access point of the non-3GPP network; or initiating, to a local gateway, subscription to a cell load status; or initiating, to a local gateway, subscription to quality of service information or user-level link quality information; or initiating, to a policy and charging rules function PCRF unit, subscription to a data package/tariff usage status;

an update module 106, configured to update the ISRP offloading policy according to the multi-dimensional information that is subscribed by the subscription module 105; and a fourth feedback module 107, configured to send, to the UE, the ISRP offloading policy that is updated by the update module.

For specific execution processes of the foregoing modules, reference may be made to related content disclosed in Embodiment 2 of the present invention, and details are not described herein again.

Figure 9:
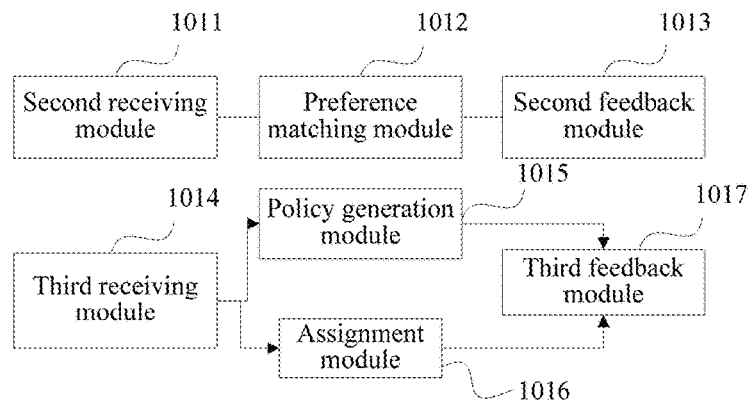
FIG. 9 is a schematic structural diagram of another apparatus for service offloading between different networks according to Embodiment 6 of the present invention.

Based on the method for service offloading between different networks disclosed in Embodiment 3 of the present invention, as shown in FIG. 9, a structure of the capability negotiation module 101 shown in FIG. 7 includes:

a second receiving module 1011, configured to receive the network capability request that is sent by the UE, where the network capability request carries a capability attribute set of the UE;

a preference matching module 1012, configured to perform, according to preset capability attribute priorities, matching between a capability attribute on a network side and a capability attribute of the UE that is received by the second receiving module 1011, to determine the preferred capability attribute; and a second feedback module 1013, configured to: notify the UE of the preferred capability attribute that is determined by the preference matching module 1012, and when the preferred capability attribute includes the non-seamless concurrency attribute or the seamless concurrency attribute, enable the UE to reestablish a service bearer according to the non-seamless concurrency attribute or the seamless concurrency attribute when a preset occasion occurs.

When the preferred capability attribute notified by the second feedback module 1013 to the UE includes a non-seamless switching attribute or seamless switching, the capability negotiation module 101 further includes:

a third receiving module 1014, configured to receive an ISMP request that is sent by the UE when the UE is in a state in which the non-3GPP network is opened and is not connected to, and a non-3GPP network hotspot is obtained by scanning;

a policy generation module 1015, configured to generate an ISMP network selection policy according to a CGI and the non-3GPP network information that is obtained by scanning, and/or an access center and cell network status information of the non-3GPP network that are carried in the ISMP request received by the third receiving module 1014;

an assignment module 1016, configured to assign a priority to a BSSID in a BSSID list according to a list of basic service set identifier BSSIDs of non-3GPP networks that is carried in the ISMP request received by the third receiving module 1014; and a third feedback module 1017, configured to feed back, to the UE, the ISMP network selection policy that is generated by the policy generation module 1015, and the BSSID list having the BSSID to which the priority is assigned by the assignment module 1016, so that the UE accesses the non-3GPP network according to the ISMP network selection policy and the assigned BSSID priority.

For specific execution processes of the foregoing modules, reference may be made to related content disclosed in Embodiment 3 of the present invention, and details are not described herein again.

Figure 10:
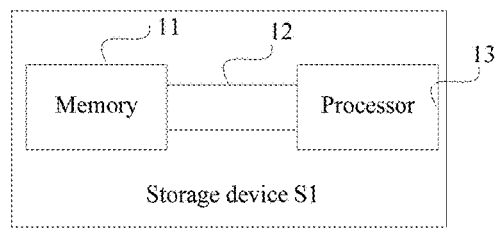
FIG. 10 is a schematic structural diagram of a storage device according to Embodiment 6 of the present invention.

Based on the apparatus for service offloading between different networks disclosed in this embodiment of the present invention, as can be learned from the foregoing description, a person skilled in the art can clearly know that this application can be implemented by software plus a necessary universal hardware platform. Therefore, an embodiment of the present invention further provides a storage device S1. A structure of the storage device S1 is shown in FIG. 10, and the storage device S1 mainly includes a memory 11 and a processor 13 that is connected to the memory 11 by using a bus 12.

The memory 11 may include a high-speed RAM memory, and may also include a non-volatile memory, for example, at least one magnetic disk storage. The memory 11 stores an operating program that is applied to an ANDSF unit to perform service offloading between different networks. When service offloading between different networks is performed, the processor 13 runs the foregoing program. The foregoing program may include program code, and the program code includes a computer operation instruction.

The processor 13 may be a central processing unit CPU, or an ASIC, or one or more integrated circuits configured as the embodiments of the present invention.

The operating program that is applied to an ANDSF unit to perform service offloading between different networks specifically may include:

receiving, by an ANDSF unit, an ISRP request that is sent by user equipment by using a 3GPP network; and when the ANDSF unit finds, according to a cell global identification CGI that is carried in the ISRP request, that a non-3GPP network exists, sending, by the ANDSF unit, an instruction for instructing to access the non-3GPP network, and an ISRP offloading policy to the user equipment.

Figure 11:
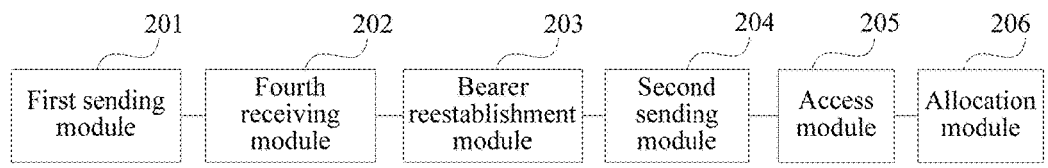
FIG. 11 is a schematic structural diagram of another apparatus for service offloading between different networks according to Embodiment 6 of the present invention.

FIG. 11 shows an apparatus, which corresponds to the method for service offloading between different networks disclosed in Embodiment 4 of the present invention, for service offloading between different networks. The apparatus is applied to UE, where it is already preset that the UE installs and runs an APP that uses the method, and the apparatus includes:

a first sending module 201, configured to send a network capability request to the ANDSF unit, where the network capability request carries a capability attribute set of the UE, and is used to instruct the ANDSF to perform matching between a capability attribute on a network side and a capability attribute of the user equipment according to preset capability attribute priorities, to determine a preferred capability attribute;

a fourth receiving module 202, configured to receive the preferred capability attribute that is fed back by the ANDSF unit;

a bearer reestablishment module 203, configured to: when the preferred capability attribute received by the fourth receiving module 202 includes a non-seamless concurrency attribute or a seamless concurrency attribute, reestablish a service bearer when a preset occasion occurs, where the preset occasion includes that the UE detects that a service is paused or a service is stopped, or traffic of the 3GPP network decreases to a threshold;

a second sending module 204, configured to send an ISRP request to the ANDSF unit by using the 3GPP network, where the ISRP request is used to trigger the ANDSF unit to send an instruction for instructing to access a non-3GPP network, and an ISRP offloading policy to the UE;

an access module 205, configured to access the non-3GPP network according to the instruction for instructing to access the non-3GPP network that is fed back by the ANDSF unit; and an allocation module 206, configured to allocate, according to the ISRP offloading policy that is fed back by the ANDSF unit, services that separately camp on the 3GPP network and the non-3GPP network, where the instruction for instructing to access the non-3GPP network includes an option that is used to instruct the user equipment to turn on a non-3GPP network opening switch that is used to connect to the non-3GPP network, and non-3GPP network hotspot information that is used by the user equipment for scanning and accessing the non-3GPP network.

For specific execution processes of the foregoing modules, reference may be made to related content disclosed in Embodiment 4 of the present invention, and details are not described herein again.

Figure 12:
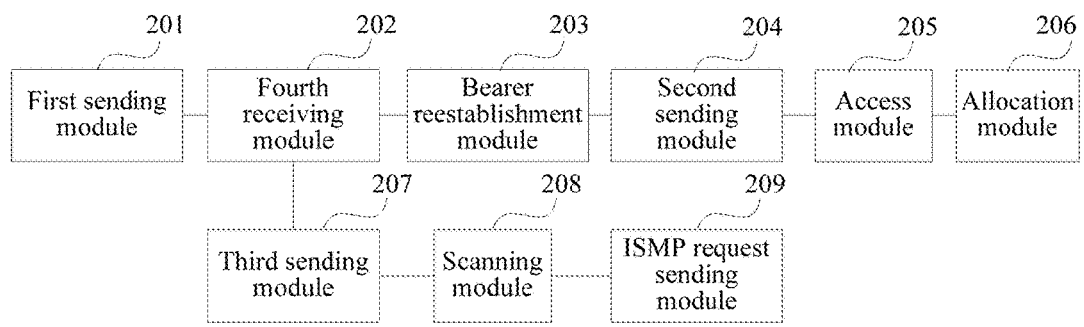
FIG. 12 is a schematic structural diagram of another apparatus for service offloading between different networks according to Embodiment 6 of the present invention.

Based on the method for service offloading between different networks disclosed in Embodiment 5 of the present invention, with reference to the accompanying drawing 11, as shown in FIG. 12, the apparatus further includes:

a third sending module 207, configured to: when the preferred capability attribute received by the fourth receiving module 202 includes a non-seamless switching attribute or a seamless switching attribute, send a discovery information request to the ANDSF unit when the UE is in a state in which the non-3GPP network is closed, where the discovery information request carries a CGI, and is used to trigger the ANDSF unit to feed back response information that carries non-3GPP network hotspot information corresponding to 3GPP network information;

a scanning module 208, configured to receive the response information, turn on the switch of the non-3GPP network, and scan the non-3GPP network hotspot information according to the 3GPP network information; and an ISMP request sending module 209, configured to send an ISMP request to the ANDSF when the user equipment is in a state in which the non-3GPP network is opened and is not connected to, and the non-3GPP network hotspot information is obtained by scanning, where the ISMP request is used to acquire, from the ANDSF unit, an ISMP network selection policy, and an assigned BSSID priority according to which the non-3GPP network is accessed.

For specific execution processes of the foregoing modules, reference may be made to related content disclosed in Embodiment 5 of the present invention, and details are not described herein again.

Figure 13:
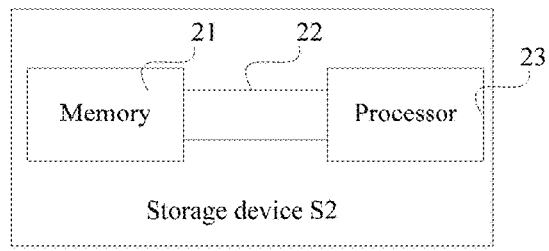
FIG. 13 is a schematic structural diagram of another storage device according to Embodiment 6 of the present invention.

Based on the apparatus for service offloading between different networks disclosed in this embodiment of the present invention, as can be learned from the foregoing description, a person skilled in the art can clearly know that this application can be implemented by software plus a necessary universal hardware platform. Therefore, an embodiment of the present invention further provides a storage device S2. A structure of the storage device S2 is shown in FIG. 13, and the storage device S2 mainly includes a memory 21 and a processor 23 that is connected to the memory 21 by using a bus 22.

The memory 21 may include a high-speed RAM memory, and may also include a non-volatile memory, for example, at least one magnetic disk storage. The memory 21 stores an operating program that is applied to UE to perform service offloading between different networks. When service offloading between different networks is performed, the processor 23 runs the foregoing program. The foregoing program may include program code, and the program code includes a computer operation instruction.

The processor 23 may be a central processing unit CPU, or an ASIC, or one or more integrated circuits configured as the embodiments of the present invention.

The operating program that is applied to UE to perform service offloading between different networks specifically may include:

sending, by the UE, an ISRP request to an ANDSF unit by using a 3GPP network, where the ISRP request is used to trigger the ANDSF unit to send an instruction for instructing to access the non-3GPP network, and an ISRP offloading policy to the UE;

accessing, by the UE, the non-3GPP network according to the instruction for instructing to access the non-3GPP network that is fed back by the ANDSF unit; and allocating, by the UE, according to the ISRP offloading policy that is fed back by the ANDSF unit, services that separately camp on the 3GPP network and the non-3GPP network.

Embodiment 7

Based on a method and an apparatus for service offloading between different networks recorded in Embodiment 1 of the present invention to Embodiment 6 of the present invention, in Embodiment 7 of the present invention, the foregoing content is further described in a comprehensive manner by using an example in an actual application.

Example 1

Figure 14:
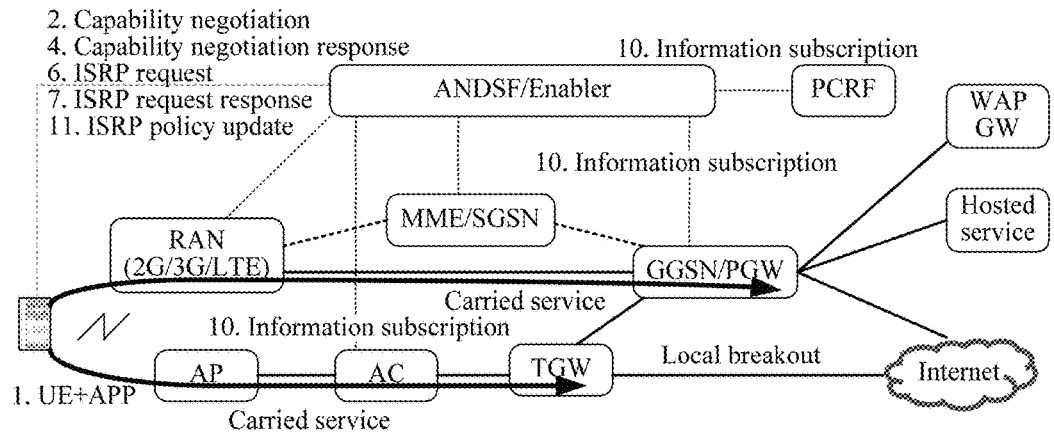
FIG. 14 is a schematic structural diagram of example 1 according to Embodiment 7 of the present invention.

In the current example 1, UE supports a non-seamless concurrency capability attribute and a non-seamless switching capability attribute, and a network side supports the non-seamless switching capability attribute, a seamless switching capability attribute, and the non-seamless concurrency capability attribute. A process thereof is shown in FIG. 14, and a bold black line with an arrow in the figure indicates that a 3GPP network and a non-3GPP network simultaneously carry a service.

1. Preset condition: The UE installs and runs an APP.

2. Capability negotiation request: The UE initiates a network capability request (Network Capability Request) that carries a terminal capability attribute (non-seamless switching and non-seamless concurrency).

3. Capability matching: An ANDSF receives the network capability request of the UE; and the ANDSF performs matching between a capability attribute (the non-seamless switching, the seamless switching, and the non-seamless concurrency) on a network side and a capability attribute (the non-seamless concurrency and the non-seamless switching) of the UE according to the capability attribute (the non-seamless switching, the seamless switching, and the non-seamless concurrency) supported by the network side of an operator, and selects a non-seamless concurrency procedure according to a capability matching priority.

4. Capability negotiation response: The ANDSF responds to the network capability request, and adds the non-seamless concurrency capability attribute.

5. Reestablish a bearer: The UE disconnects, on a preset occasion and according to the non-seamless concurrency capability attribute that is added in response to the network capability request, a bearer originally established by an APN; and reestablishes a bearer by using a converged APN. According to this process, it is ensured that although connected to a WLAN network, the UE can still perform data access by using a 3GPP network (where for an Android system, a multimedia message APN is used, and when connected to a WLAN network, the UE can still perform data connection by means of the multimedia message APN by using a 3GPP network).

6. ISRP request: The UE initiates, by using the 3GPP network, an ISRP request that carries user IMSI and CGI information.

7. ISRP response: The ANDSF queries, according to the CGI information, whether a WiFi network exists; and if the WiFi network exists, the ANDSF sends, to the UE, an ISRP offloading policy in an initial state, an option for turning on a WiFi switch, and hotspot information; and if no WiFi network exists, the ANDSF replies that no WiFi network exists in a current area, and delivers no ISRP offloading policy.

8. The UE executes the ISRP policy: When the responded ISRP policy carries the option for turning on the WiFi switch, the UE turns on the WiFi switch, scans and accesses the WiFi network (if the UE already turns on the WiFi switch, the UE directly scans and accesses the WiFi network), and executes the ISRP offloading policy in the initial state; and if no WiFi network is obtained by scanning, the ISRP offloading policy is not executed, and all services are still carried on the 3GPP network.

9. Respond to the ISRP policy: The UE replies to the ANDSF whether to access the WiFi network.

10. The ANDSF initiates information subscription: The ANDSF initiates a procedure of subscribing to multi-dimensional information (information such as a network load status, a data package/tariff status, and quality of service). The ANDSF initiates, to an AC, subscription to AP load by using an Enabler, the ANDSF initiates, to a GGSN/PGW, subscription to cell load by using an Enabler, the ANDSF initiates, to a PCRF, subscription to a data package/tariff usage status by using an Enabler, or the ANDSF initiates, to a GGSN/PGW, subscription to quality of service or user-level link quality information by using an Enabler.

11. The ANDSF updates the policy: The ANDSF updates the ISRP policy according to the subscribed multi-dimensional information, and delivers the updated ISRP policy to the UE for execution.

12. The UE responds with a policy update result: The UE returns the policy update result to the ANDSF.

Example 2

Figure 15:
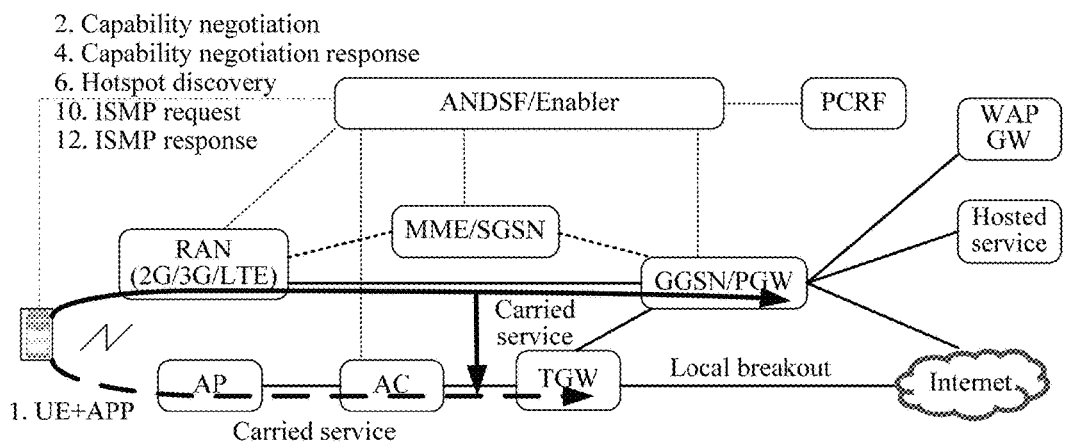
FIG. 15 is a schematic structural diagram of example 2 according to Embodiment 7 of the present invention.

In the current example 2, the UE supports a non-seamless concurrency capability attribute and a non-seamless switching capability attribute, and the network side supports only the non-seamless switching capability attribute. A process thereof is shown in FIG. 15, and a bold black solid-dashed line with an arrow in the figure indicates that all services can be carried on only a same network at a same time.

1. Preset condition: The UE installs and runs an APP.
2. Capability negotiation request: The UE initiates a network capability request (Network Capability Request) that carries a terminal capability attribute (non-seamless switching and non-seamless concurrency).
3. Capability matching: An ANDSF receives the network capability request of the UE; and the ANDSF performs matching between a capability attribute (the non-seamless switching) on a network side and a capability attribute (the non-seamless concurrency and the non-seamless switching) of the UE according to the capability attribute (the non-seamless switching) supported by the network side of an operator.
4. Capability negotiation response: The ANDSF responds to the network capability request, and adds the non-seamless switching capability attribute.
5. If an initial state is that a WLAN is opened and is not connected (WLAN network selection is not performed in a connection status), after a WLAN hotspot in which a user is interested is obtained by scanning, directly perform an ISMP request procedure. That is, skip performing steps 6 to 9; and if a WLAN is not opened, continue to perform step 6.
6. Hotspot discovery request: The UE sends, to the ANDSF, a discovery information request (Discovery Information Request) that carries IMSI and CGI information.
7. Hotspot query: The ANDSF queries a cell list according to the CGI; and if a hotspot exists in a current cell, the ANDSF recommends the terminal to try to scan a WLAN hotspot.
8. Hotspot discovery response: The ANDSF responds to the discovery information request of the UE, where discovered WLAN network information such as an SSID list is carried.
9. Hotspot scanning: The UE turns on a WLAN switch, and performs scanning according to an SSID carried in a message.
10. ISMP request: If obtaining a result by scanning, the UE sends an ISMP Request message to the ANDSF to request for a network access policy ISMP, where the message provides a CGI of the UE and the WLAN network information (a BSSID, a SSID, and an RSSI) obtained by scanning.
11. The ANDSF generates an ISMP policy: The ANDSF generates an ISMP network selection policy according to information such as AP and cell network statuses.
12. ISMP response: The ANDSF responds with an ISMP Response message, where the message carries a list of BSSIDs of networks that can be accessed, and assigns a priority.
13. The UE executes the ISMP policy: The UE saves the ISMP policy after receiving the ISMP policy, then returns a Response ACK to the ANDSF, to confirm receiving, and selects an assigned BSSID according to an instruction of the ANDSF, to access a WiFi network.

In conclusion, in this embodiment of the present invention, by means of capability negotiation between an ANDSF unit and UE, a network side controls the UE to send an ISRP request to the ANDSF unit; a non-3GPP network is accessed by using an instruction, generated by the ANDSF unit according to the ISRP request, for instructing to access the non-3GPP network; and after the UE is simultaneously connected to a 3GPP network and the non-3GPP network, services of the UE that camp on the 3GPP network and services of the UE that camp on the non-3GPP network are indicated according to an ISRP offloading policy that is delivered by the ANDSF unit according to the ISRP request. According to the foregoing process, an ISRP offloading policy is independently performed without first performing an ISMP procedure, to offload a service on a 3GPP network, thereby implementing that a network side controls user equipment to initiate an ISRP procedure by means of capability negotiation, and achieving an objective of saving a network resource in a service offloading process.

The embodiments in this specification are all described in a progressive manner, for same or similar parts in the embodiments, reference may be made to these embodiments, and each embodiment focuses on a difference from other embodiments.

The embodiments disclosed above are described to enable a person skilled in the art to implement or use the present invention. Various modifications to the embodiments are obvious to the person skilled in the art, and general principles defined in this specification may be implemented in other embodiments without departing from the spirit or scope of the present invention. Therefore, the present invention will not be limited to the embodiments described in this specification but extends to the widest scope that complies with the principles and novelty disclosed in this specification.

What is claimed is:
1. A method for service offloading between different networks, the method comprising:
determining, by an access network discovery and selection function (ANDSF) unit, a preferred capability attribute according to a network capability request sent by user equipment, and feeding back the preferred capability attribute to the user equipment, wherein the preferred capability attribute comprises a non-seamless concurrency capability attribute or a seamless concurrency capability attribute, wherein the seamless concurrency capability attribute indicates that a service is not interrupted when the service switches between a third generation partnership project (3GPP) network and a non-3GPP network, and wherein the non-seamless concurrency capability attribute indicates that the service is interrupted when the service switches between the 3GPP network and the non-3GPP network;
receiving, by the ANDSF unit, an inter-system routing policy (ISRP) request sent by the user equipment by using the 3GPP network, wherein the ISRP request is determined according to the preferred capability attribute; and
when the ANDSF unit finds, according to a cell global identification (CGI) carried in the ISRP request, that the non-3GPP network exists, sending, by the ANDSF unit, an instruction for instructing to access the non-3GPP network, and an ISRP offloading policy to the user equipment, wherein the ISRP offloading policy is used to indicate services of the user equipment that separately camp on the 3GPP network and the non-3GPP network, and wherein the instruction for instructing to access the non-3GPP network comprises an option that is used to instruct the user equipment to turn on a non-3GPP network opening switch that is used to connect to the non-3GPP network, and non-3GPP network hotspot information that is used by the user equipment for scanning and accessing the non-3GPP network.

2. The method according to claim 1, wherein determining, by the ANDSF unit, a preferred capability attribute according to a network capability request sent by user equipment, and feeding back the preferred capability attribute to the user equipment, wherein the preferred capability attribute comprises a non-seamless concurrency capability attribute or a seamless concurrency capability attribute comprises:

receiving, by the ANDSF unit, the network capability request sent by the user equipment, wherein the network capability request carries a capability attribute set of the user equipment;

performing, by the ANDSF unit, matching between a capability attribute on a network side and a capability attribute of the user equipment according to preset capability attribute priorities, to determine the preferred capability attribute;

notifying, by the ANDSF unit, the user equipment of the preferred capability attribute; and enabling the user equipment to reestablish a service bearer according to the non-seamless concurrency capability attribute or the seamless concurrency capability attribute when a preset occasion occurs.

3. The method according to claim 2, wherein the method further comprises:

receiving, by the ANDSF unit, an inter-system mobility policy (ISMP) request sent by the user equipment when the user equipment is in a state in which the non-3GPP network is opened and is not connected, and the non-3GPP network hotspot information is obtained by scanning;

generating, by the ANDSF unit, an ISMP network selection policy according to a CGI and the non-3GPP network hotspot information that is obtained by scanning, and/or an access center and cell network status information of the non-3GPP network that are carried in the ISMP request;

acquiring, by the ANDSF unit, a list of basic service set identifiers (BSSIDs) of non-3GPP networks that is carried in the ISMP request, and assigning a priority to a BSSID in the BSSID list; and feeding back, by the ANDSF unit to the user equipment, the ISMP network selection policy and the BSSID list having the BSSID to which the priority is assigned, so that the user equipment accesses the non-3GPP network according to the ISMP network selection policy and the assigned BSSID priority.

4. The method according to claim 3, wherein after sending, by the ANDSF unit, the instruction for instructing to access the non-3GPP network to the user equipment, and before receiving, by the ANDSF unit, the ISMP request sent by the user equipment when the user equipment is in a state in which the non-3GPP network is opened and is not connected, and the non-3GPP network hotspot information is obtained by scanning, the method further comprises:

receiving, by the ANDSF unit, a discovery information request sent by the user equipment;

querying, by the ANDSF unit, a cell list according to a CGI that is carried in the discovery information request; and in a state in which a hotspot exists in a current cell in which the user equipment is located, recommending the non-3GPP network hotspot information for scanning to the user equipment; and feeding back, by the ANDSF unit, response information to the user equipment, wherein the response information carries non-3GPP network hotspot information corresponding to 3GPP network information, so that the user equipment turns on the switch of the non-3GPP network, and scans the non-3GPP network hotspot information according to the 3GPP network information.

5. The method according to claim 1, wherein after sending, by the ANDSF unit, the instruction for instructing to access the non-3GPP network, and the ISRP offloading policy to the user equipment, the method further comprises:

initiating, by the ANDSF unit, a procedure of subscribing to multi-dimensional information, to acquire the subscribed multi-dimensional information;

updating, by the ANDSF unit, the ISRP offloading policy according to the subscribed multi-dimensional information;

sending, by the ANDSF unit, the updated ISRP offloading policy to the user equipment; and wherein initiating, by the ANDSF unit, the procedure of subscribing to multi-dimensional information comprises:

initiating, by the ANDSF unit to the access center of the non-3GPP network, subscription to a load status of an access point of the non-3GPP network, or initiating, by the ANDSF unit to a local gateway, subscription to a cell load status, or initiating, by the ANDSF unit to a local gateway, subscription to quality of service information or user-level link quality information, or initiating, by the ANDSF unit to a policy and charging rules function (PCRF) unit, subscription to a data package/tariff usage status.

6. A method for service offloading between different networks, the method comprising:

sending, by user equipment, a network capability request to an access network discovery and selection function (ANDSF) unit, wherein the network capability request carries a capability attribute set of the user equipment, and is used to instruct the ANDSF unit to perform matching between a capability attribute on a network side and a capability attribute of the user equipment according to preset capability attribute priorities, to determine a preferred capability attribute;

receiving, by the user equipment, the preferred capability attribute that is fed back by the ANDSF unit, and when the preferred capability attribute comprises a non-seamless concurrency capability attribute or a seamless concurrency capability attribute, reestablishing a service bearer when a preset occasion occurs, wherein the preset occasion comprises that the user equipment detects that a service is paused or a service is stopped, or traffic of a third generation partnership project (3GPP) network decreases to a threshold, wherein the seamless concurrency capability attribute indicates that a service is not interrupted when the service switches between the 3GPP network and a non-3GPP network, and wherein the non-seamless concurrency capability attribute indicates that the service is interrupted when the service switches between the 3GPP network and the non-3GPP network;

sending, by the user equipment, an inter-system routing policy (ISRP) request to the ANDSF unit by using the 3GPP network, wherein the ISRP request is used to trigger the ANDSF unit to send an instruction for instructing to access the non-3GPP network, and an ISRP offloading policy to the user equipment;

accessing, by the user equipment, the non-3GPP network according to the instruction for instructing to access the non-3GPP network that is fed back by the ANDSF unit;

allocating, by the user equipment according to the ISRP offloading policy that is fed back by the ANDSF unit, services that separately camp on the 3GPP network and the non-3GPP network; and wherein the instruction for instructing to access the non-3GPP network comprises an option that is used to instruct the user equipment to turn on a non-3GPP network opening switch that is used to connect to the non-3GPP network, and hotspot information that is used by the user equipment for scanning and accessing the non-3GPP network.

7. The method according to claim 6, further comprising:
receiving, by the user equipment, the preferred capability attribute that is fed back by the ANDSF unit;
sending, by the user equipment, a discovery information request to the ANDSF unit when the user equipment is in a state in which the non-3GPP network is closed, wherein the discovery information request carries a CGI, and is used to trigger the ANDSF unit to feed back response information that carries non-3GPP network hotspot information corresponding to 3GPP network information;
receiving, by the user equipment, the response information, turning on the switch of the non-3GPP network, and scanning the non-3GPP network hotspot information according to the 3GPP network information; and
sending, by the user equipment, an inter-system mobility policy (ISMP) request to the ANDSF unit when the user equipment is in a state in which the non-3GPP network is opened and is not connected, and the non-3GPP network hotspot information is obtained by scanning, wherein the ISMP request is used to acquire, from the ANDSF unit, an ISMP network selection policy, and an assigned basic service set identifier (BSSID) priority according to which the non-3GPP network is accessed.

8. An apparatus for service offloading between different networks, applied to an access network discovery and selection function (ANDSF) unit, the apparatus comprising:
a processor; and
a non-transitory computer readable storage medium storing instructions that, when executed by the processor, cause the apparatus to:
determine a preferred capability attribute according to a network capability request sent by user equipment, and feed back the preferred capability attribute to the user equipment, wherein the preferred capability attribute comprises a non-seamless concurrency capability attribute or a seamless concurrency capability attribute, wherein the seamless concurrency capability attribute indicates that a service is not interrupted when the service switches between a third generation partnership project (3GPP) network and a non-3GPP network, and wherein the non-seamless concurrency capability attribute indicates that the service is interrupted when the service switches between the 3GPP network and the non-3GPP network,
receive an inter-system routing policy (ISRP) request sent by the user equipment by using the 3GPP network, wherein the ISRP request is determined according to the preferred capability attribute,
query, according to a cell global identification (CGI) that is carried in the ISRP request, whether the non-3GPP network exists, and
in response to the non-3GPP network existing, send an instruction for instructing to access the non-3GPP network, and an ISRP offloading policy to the user equipment, wherein the ISRP offloading policy is used to indicate services of the user equipment that separately camp on the 3GPP network and the non-3GPP network and wherein the instruction for instructing to access the non-3GPP network comprises an option that is used to instruct the user equipment to turn on a non-3GPP network opening switch that is used to connect to the non-3GPP network, and non-3GPP network hotspot information that is used by the user equipment for scanning and accessing the non-3GPP network.

9. The apparatus according to claim 8, further comprising instructions that, when executed by the processor, cause the apparatus to:
receive the network capability request sent by the user equipment, wherein the network capability request carries a capability attribute set of the user equipment;
perform, according to preset capability attribute priorities, matching between a capability attribute on a network side and a capability attribute of the user equipment, to determine the preferred capability attribute; and
notify the user equipment of the preferred capability attribute, and enable the user equipment to reestablish a service bearer according to the non-seamless concurrency capability attribute or the seamless concurrency capability attribute when a preset occasion occurs.

10. The apparatus according to claim 9, wherein the computer readable storage medium further comprises instructions that, when executed by the processor, cause the apparatus to:
receive an inter-system mobility policy (ISMP) request sent by the user equipment when the user equipment is in a state in which the non-3GPP network is opened and is not connected, and the non-3GPP network hotspot information is obtained by scanning;
generate an ISMP network selection policy according to a CGI and the non-3GPP network hotspot that is obtained by scanning, and/or an access center and cell network status information of the non-3GPP network that are carried in the ISMP request;
assign a priority to a basic service set identifier (BSSID) in a BSSID list according to a list of basic service set identifier BSSIDs of non-3GPP networks that is carried in the ISMP request; and
feedback, to the user equipment, the ISMP network selection policy, and the BSSID list having the BSSID.

11. The apparatus according to claim 8, further comprising instructions that, when executed by the processor, cause the apparatus to:
initiate a procedure of subscribing to multi-dimensional information, to acquire the subscribed multi-dimensional information, wherein initiating the procedure of subscribing to multi-dimensional information comprises:
initiating, to the access center of the non-3GPP network, subscription to a load status of an access point of the non-3GPP network; or
initiating, to a local gateway, subscription to a cell load status; or initiating, to a local gateway, subscription to quality of service information or user-level link quality information; or
initiating, to a policy and charging rules function (PCRF) unit, subscription to a data package/tariff usage status;
update the ISRP offloading policy according to the multi-dimensional information that is subscribed by the subscription module; and send, to the user equipment, the ISRP offloading policy that is updated by the update module.

12. An apparatus for service offloading between different networks, applied to user equipment, the apparatus comprising:
- a processor; and
- a non-transitory computer readable storage medium storing instructions that, when executed by the processor, cause the apparatus to:
  - send a network capability request to an access network discovery and selection function (ANDSF) unit, wherein the network capability request carries a capability attribute set of the user equipment, and is used to instruct the ANDSF unit to perform matching between a capability attribute on a network side and a capability attribute of the user equipment according to preset capability attribute priorities, to determine a preferred capability attribute,
  - receive the preferred capability attribute that is fed back by the ANDSF unit,
  - when the preferred capability attribute comprises a non-seamless concurrency capability attribute or a seamless concurrency capability attribute, reestablish a service bearer when a preset occasion occurs, wherein the preset occasion comprises that the user equipment detects that a service is paused or a service is stopped, or traffic of a third generation partnership project (3GPP) network decreases to a threshold, wherein the seamless concurrency capability attribute indicates that a service is not interrupted when the service switches between the 3GPP network and a non-3GPP network, and wherein the non-seamless concurrency capability attribute indicates that the service is interrupted when the service switches between the 3GPP network and the non-3GPP network,
  - send an inter-system routing policy (ISRP) request to the access network discovery and selection function (ANDSF) unit by using the 3GPP network, wherein the ISRP request is used to trigger the ANDSF unit to send an instruction for instructing to access the non-3GPP network, and an ISRP offloading policy to the user equipment,
  - access the non-3GPP network according to the instruction for instructing to access the non-3GPP network that is fed back by the ANDSF unit, and
  - allocate, according to the ISRP offloading policy that is fed back by the ANDSF unit, services that separately camp on the 3GPP network and the non-3GPP network, wherein the instruction for instructing to access the non-3GPP network comprises an option that is used to instruct the user equipment to turn on a non-3GPP network opening switch that is used to connect to the non-3GPP network, and hotspot information that is used by the user equipment for scanning and accessing the non-3GPP network.

13. The apparatus according to claim 12, further comprising instructions that, when executed by the processor, cause the apparatus to:
- when the preferred capability attribute comprises a non-seamless switching attribute or a seamless switching attribute, send a discovery information request to the ANDSF unit when the user equipment is in a state in which the non-3GPP network is closed, wherein the discovery information request carries a CGI, and is used to trigger the ANDSF unit to feed back response information that carries non-3GPP network hotspot information corresponding to 3GPP network information;
- receive the response information, turn on the switch of the non-3GPP network, and scan the non-3GPP network hotspot information according to the 3GPP network information; and
- send an inter-system mobility policy (ISMP) request to the ANDSF unit when the user equipment is in a state in which the non-3GPP network is opened and is not connected, and the non-3GPP network hotspot information is obtained by scanning, wherein the ISMP request is used to acquire, from the ANDSF unit, an ISMP network selection policy, and an assigned basic service set identifier (BSSID) priority according to which the non-3GPP network is accessed.

* * * * *